United States Patent
Pasa

(10) Patent No.: US 10,525,650 B2
(45) Date of Patent: Jan. 7, 2020

(54) BALER PLUNGER GUIDE SYSTEM

(71) Applicant: Deere & Company, Moline, IL (US)

(72) Inventor: Joshua J. Pasa, Centerville, IA (US)

(73) Assignee: Deere & Company, Moline, IL (US)

( * ) Notice: Subject to any disclaimer, the term of this patent is extended or adjusted under 35 U.S.C. 154(b) by 259 days.

(21) Appl. No.: 15/787,031

(22) Filed: Oct. 18, 2017

(65) Prior Publication Data

US 2019/0111646 A1    Apr. 18, 2019

(51) Int. Cl.
*A01F 15/04* (2006.01)
*B30B 15/04* (2006.01)

(52) U.S. Cl.
CPC .......... *B30B 15/041* (2013.01); *A01F 15/042* (2013.01); *A01F 15/046* (2013.01)

(58) Field of Classification Search
CPC ...... A01F 15/04; A01F 15/042; A01F 15/046; B30B 15/041; B30B 9/30; A01D 2085/007; B60B 17/0068; B60B 17/0075; B60B 17/0082; B60B 17/0086; B66C 9/08
USPC .............................................. 100/179, 188 R
See application file for complete search history.

(56) References Cited

U.S. PATENT DOCUMENTS

| | | | |
|---|---|---|---|
| 2,948,101 A | 8/1960 | Long | |
| 3,059,569 A | 10/1962 | Nolt | |
| 4,135,445 A | 1/1979 | Smith | |
| 6,322,121 B1 * | 11/2001 | French | B60B 17/0068 104/242 |
| 7,562,619 B1 | 7/2009 | Fortier et al. | |
| 2004/0237831 A1 * | 12/2004 | Tremblay | B60B 11/02 105/72 |
| 2005/0056165 A1 | 3/2005 | Roth | |
| 2012/0240793 A1 | 9/2012 | Dedeurwaerder et al. | |
| 2015/0150193 A1 * | 6/2015 | Biebuyck | A01F 15/042 100/245 |

(Continued)

FOREIGN PATENT DOCUMENTS

| | | |
|---|---|---|
| EP | 2255611 A1 | 12/2010 |
| EP | 2502485 A1 | 9/2012 |
| EP | 2836061 A1 | 2/2015 |

(Continued)

OTHER PUBLICATIONS

Extended European search report for application No. 18200941.5 dated Feb. 20, 2019.

*Primary Examiner* — Jimmy T Nguyen
(74) *Attorney, Agent, or Firm* — Klintworth & Rozenblat IP LLP

(57) ABSTRACT

A baler is provided that includes a housing that defines a baling chamber and a plunger movable along an axis within the baling chamber to compress the crop material. The baler includes a first guide rail coupled to an exterior surface of the baling chamber and a second guide rail coupled to the exterior surface of the baling chamber. The baler includes at least one bearing coupled to the plunger to guide a movement of the plunger within the baling chamber. The bearing has a first bearing surface, a second bearing surface and a third bearing surface. The first bearing surface engages the first guide rail, the second bearing surface engages the first guide rail and the third bearing surface engages the second guide rail to constrain a vertical movement and a lateral movement of the plunger relative to the baling chamber.

16 Claims, 10 Drawing Sheets

(56) References Cited

U.S. PATENT DOCUMENTS

2015/0208584 A1* 7/2015 Boone .................. B30B 9/3021
56/341

FOREIGN PATENT DOCUMENTS

GB 773068 A 4/1957
WO 2013152988 A1 10/2013

* cited by examiner

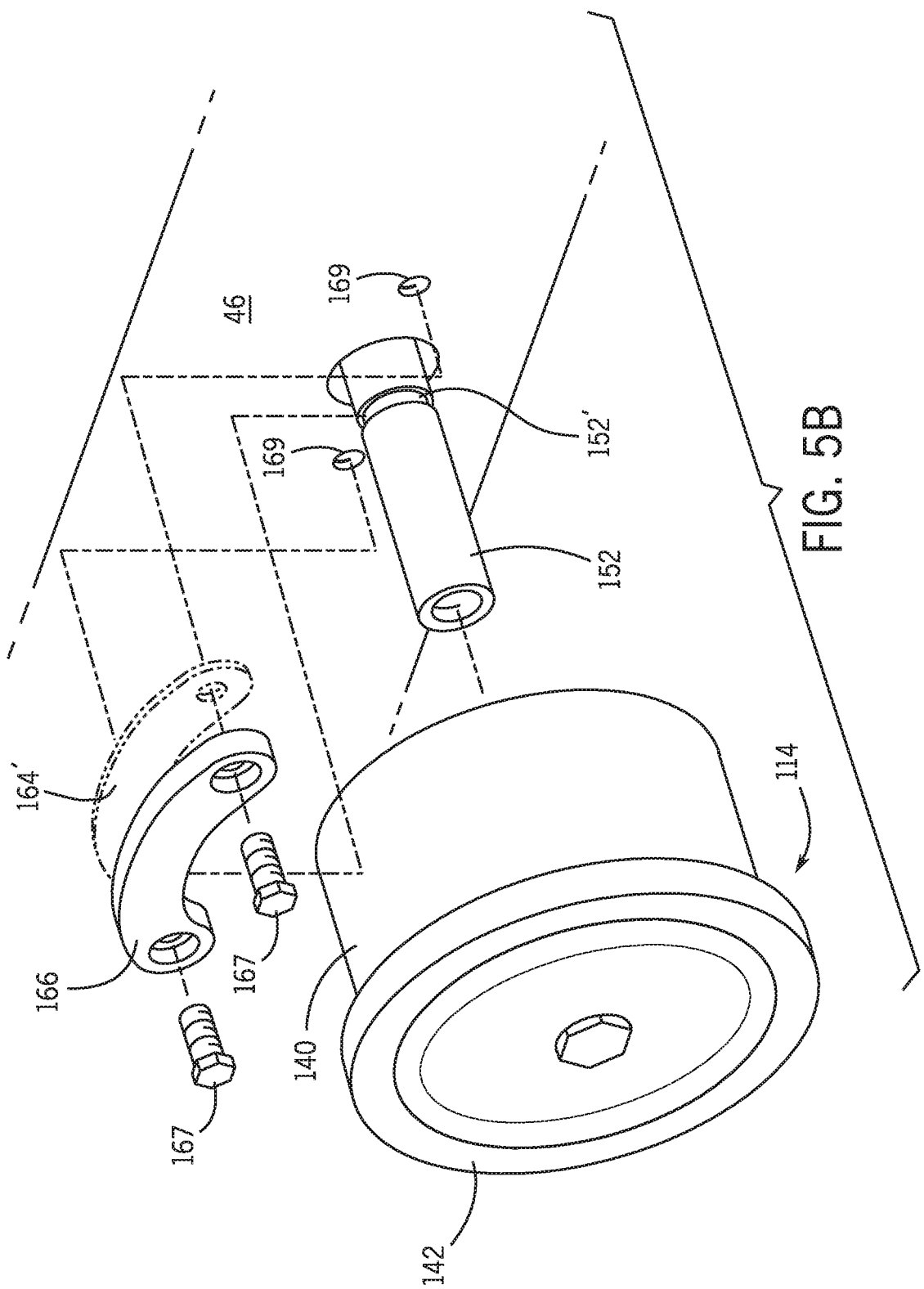

BALER PLUNGER GUIDE SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to crop-packing devices, such as balers, and to a plunger guide system for a baler.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may then be utilized to gather such material. For example, a crop-packaging device such as a baler may be pulled by a tractor along a windrow of cut material and may gather the material from the windrow. The material may then be passed into a packaging (e.g., baling) chamber for formation into a crop package (e.g., a bale). In various configurations, such a crop package may be generally rectangular in shape and may be typically referred to as a "rectangular" or "square" bale. Similarly, a baler that forms a rectangular or square bale may be referred to as a "square" baler.

In the example configuration of a square baler, a plunger may move within a baling chamber to compress the cut material into the square bale. Generally, the plunger moves reciprocally within the baling chamber to form the square bale. In certain instances, it may be desirable to adjust a position of the plunger relative to the baling chamber to ensure proper alignment of the plunger within the baling chamber, for example. Typically, in order to adjust the position of the plunger, the operator has to take apart portions of the baler to access the baling chamber to adjust the plunger position. This is time consuming, and reduces the efficiency of the baling operation.

SUMMARY OF THE DISCLOSURE

The disclosure provides a plunger guide system for a baler, which enables an operator to adjust a lateral position of a plunger externally of the baling chamber.

In one aspect the disclosure provides a baler. The baler includes a housing that defines a baling chamber to receive crop material, and a plunger movable along an axis within the baling chamber to compress the crop material. The baler includes a first guide rail coupled to an exterior surface of the baling chamber that extends substantially parallel to the axis, and a second guide rail coupled to the exterior surface of the baling chamber and spaced apart from the first guide rail. The baler also includes at least one bearing coupled to the plunger to guide a movement of the plunger within the baling chamber. The at least one bearing has a first bearing surface, a second bearing surface and a third bearing surface. The first bearing surface engages the first guide rail, the second bearing surface engages the first guide rail and the third bearing surface engages the second guide rail to constrain a vertical movement and a lateral movement of the plunger relative to the baling chamber.

In another aspect, the disclosure provides a baler. A baler includes a housing that defines a baling chamber to receive crop material and a plunger movable along an axis within the baling chamber to compress the crop material. The baler includes a first guide rail coupled to an exterior surface of the baling chamber that extends substantially parallel to the axis, and a second guide rail coupled to the exterior surface of the baling chamber and spaced apart from the first guide rail. The baler includes at least one bearing coupled to the plunger to guide a movement of the plunger within the baling chamber. The at least one bearing includes a bearing body having a first bearing surface and a disk having second bearing surface and a third bearing surface. The first bearing surface engages the first guide rail, the second bearing surface engages the first guide rail and the third bearing surface engages the second guide rail to constrain a vertical movement and a lateral movement of the plunger relative to the baling chamber.

In yet another aspect, the disclosure provides a baler. The baler includes a housing that defines a baling chamber to receive crop material, and a plunger movable along an axis within the baling chamber to compress the crop material. The baler includes a first guide rail coupled to an exterior surface of the baling chamber that extends substantially parallel to the axis, and a second guide rail coupled to the exterior surface of the baling chamber and spaced apart from the first guide rail. The baler includes at least one bearing coupled to the plunger to guide a movement of the plunger within the baling chamber. The at least one bearing includes a bearing body having a first bearing surface defined about a perimeter of the bearing body and a disk having second bearing surface defined on an inner surface of the disk near a perimeter of the disk and a third bearing surface defined on the perimeter of the disk. The disk overhangs the first guide rail and the bearing body is adjustably coupled to the disk. The first bearing surface engages the first guide rail, the second bearing surface engages the first guide rail and the third bearing surface engages the second guide rail to constrain a vertical movement and a lateral movement of the plunger relative to the baling chamber.

The details of one or more embodiments are set forth in the accompanying drawings and the description below. Other features and advantages will become apparent from the description, the drawings, and the claims.

BRIEF DESCRIPTION OF THE DRAWINGS

FIG. 5B is an exploded view showing an adjustment mechanism for the bearing of FIG. 5;

Like reference symbols in the various drawings indicate like elements.

DETAILED DESCRIPTION

Figure 1:
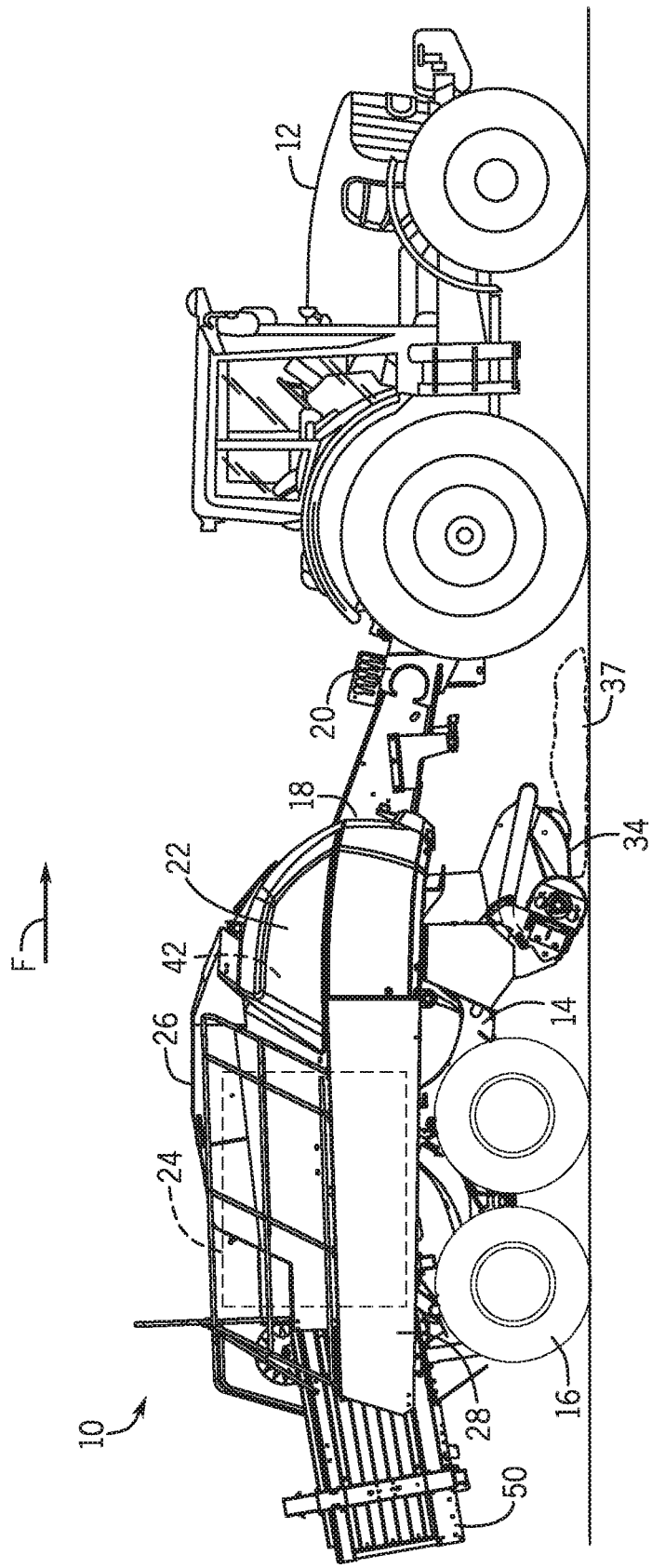
FIG. 1 is a perspective view of an example work vehicle in the form of a tractor, which includes an exemplary crop-packaging device, such as a baler, having a plunger guide system that constrains a movement of a plunger within a baling chamber according to various embodiments of this disclosure.

The following describes one or more example embodiments of the disclosed system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

The following describes one or more example implementations of the disclosed system for a plunger guide system for a crop-packaging device, such as a baler, as shown in the accompanying figures of the drawings described briefly above. The following description relates to the baler that produces rectangular or "square" bales. The term "square" as used herein with respect to crop packaging (e.g., "square bale" or "square baler") refers to a crop module (or a machine that produces a crop module) that is generally rectangular in shape, despite not necessarily having equal length sides. The term "square" thus may be considered synonymous with the term "rectangular" for purposes of this disclosure. It should be noted, however, that the disclosed plunger guide system may be utilized with a variety of crop-packaging devices. Generally, the disclosed systems provide for the improved lateral alignment of a plunger relative to a baling chamber, which is movable within the baling chamber to form a square bale in a square baler.

In this regard, the disclosed plunger guide system includes, on each side of the baling chamber, a pair of guide rails and a pair of bearings. The pair of rails are each coupled to the side of the baling chamber so as to be external to or outside of the baling chamber. Generally, the pair of bearings are coupled to the plunger, via respective shafts, so as to guide the reciprocal movement of the plunger within the baling chamber. In one example, each of the pair of bearings includes a body and a disk coupled to the body. The disk overhangs the first guide rail, and cooperates with an edge of the first guide rail to constrain a lateral position of the plunger. The disk also cooperates with the second guide rail to constrain a vertical position of the plunger. The body cooperates with the first guide rail to constrain the vertical position of the plunger. By coupling the disk to the body of the bearings, the lateral position of the plunger is constrained without requiring additional lateral bearings or mechanisms to constrain the lateral position of the plunger. This provides for a reduction in parts associated with the plunger. Moreover, one or more shims may be positioned between the disk and the body to enable further adjustments and fine tuning of the lateral position, which is able to be performed outside of the baling chamber. By enabling the adjustment of the lateral and vertical position or alignment of the plunger within the baling chamber by the plunger guide system that is external to the baling chamber, the operator may easily adjust the plunger without interfering with a current formation of a bale within the baling chamber or without having to remove the side walls of the baling chamber.

As noted above, with reference to FIG. 1, the system described herein may be employed with respect to a variety of crop-packaging devices, such as a baler 10. The baler 10 is configured to be towed by a tractor 12, and in this example is a square baler. The baler 10 has a main frame 14 supported on a pair of ground wheels 16. The main frame 14 includes a draft tongue 18 having a rear end joined to the main frame 14 and a forward end defined by the clevis arrangement 20 adapted for being coupled to a drawbar (not shown) of the tractor 12.

Figure 2:
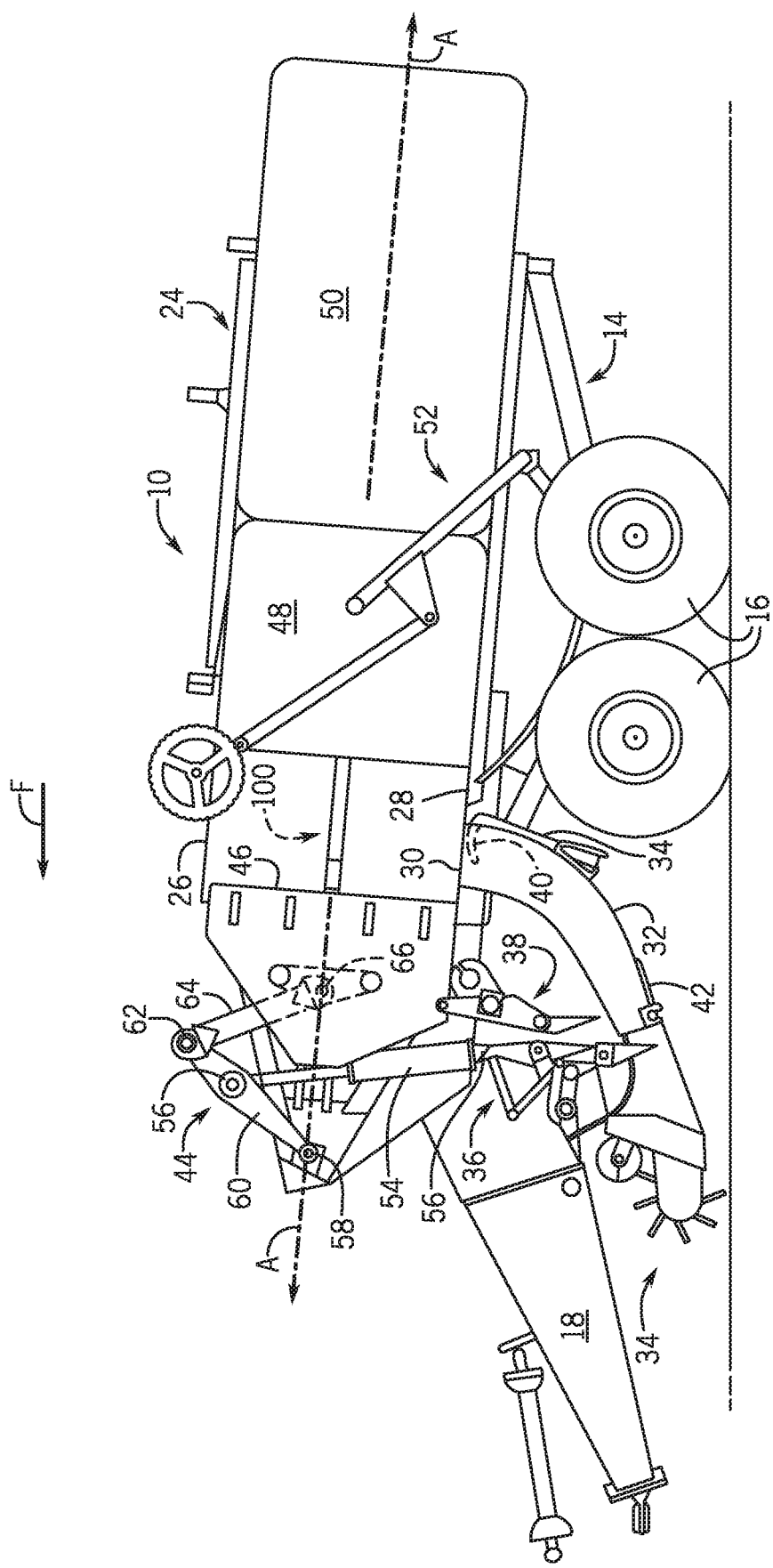
FIG. 2 is a schematic view of the baler of FIG. 1, which illustrates the plunger and the baling chamber.

The main frame 14 supports a housing 22, which defines a baling chamber 24 and includes a plunger guide system 100 (FIG. 2). With reference to FIG. 2, the baling chamber 24 includes substantially parallel top and bottom walls 26 and 28, respectively and opposite, parallel side walls 27 and 29 (FIG. 3), which are all arranged so as to have a square or rectangular cross section to define a substantially rectangular chute. The bottom wall 28 is provided with a crop inlet 30 to which is coupled the upper end of a pre-compression chamber 32 in the form of a duct that curves upwardly and rearwardly from a crop pick-up 34. Located in the region between the crop pick-up 34 and the pre-compression chamber 32 is a feeder fork arrangement 36 that operates to positively move crop material 37 into the forward end of the pre-compression chamber 32. Transversely spaced tines of a pivotally mounted crop blocking fork 40 are selectively movable between a crop retaining position, as shown, wherein they extend through over an upper edge of a back wall of the pre-compression chamber 32 at a location adjacent the crop inlet 30 of the baling chamber 24, and a rearwardly pivoted crop release position, for permitting an accumulated charge of the crop material 37 to be moved into the baling chamber 24 through operation of a stuffing fork 38. The stuffing fork 38 has transversely spaced forks that move down through slots provided in a front wall of the pre-compression chamber 32, and then sweep upwardly through the pre-compression chamber 32 to move the charge of the crop material 37 into the baling chamber 24. Appropriate actuators, not shown, are associated with the blocking fork 40 and stuffing fork 38, and are associated with controls that are sequenced to effect retraction of the blocking fork 40 and then operation of the stuffing fork 38 once the charge of the crop material 37 has reached a pre-selected density as determined by a spring loaded, density sensing door 42.

Once the charge of the crop material 37 has been moved into the baling chamber 24, it is moved rearwardly by operation of a plunger drive 44 acting on a plunger 46 which compresses the charge of the crop material 37 against a partially formed bale 48 and a completely formed bale 50 which has already been bound together by several transversely spaced loops of twine that have been placed there by operation of a twine tying arrangement, of which only a needle yoke 52 is shown, which is pivotally mounted for delivering twine through the baling chamber when a bale reaches a predetermined length.

In one example, the plunger drive 44 includes an extensible and retractable hydraulic drive cylinder 54 having its cylinder end anchored to the main frame 14 by a coupling pin 56, and having its rod end pivotally coupled, as at pin 58, to a crank arm 60. The crank arm 60 is mounted for oscillating about a horizontal transverse axis defined by a pin 58 coupling the forward end of the crank arm 60 to the main frame 14. The rear end of the crank arm 60 is pivotally coupled, as by a coupling pin 62, to the forward ends of a parallel pair of transversely spaced connecting rods 64 having their rear ends pivotally coupled to the plunger 46 by respective coupling pins 66. The hydraulic drive cylinder 54 is shown in its retracted position in FIG. 2, this position corresponding to that which it occupies when the plunger 46 is fully extended to the rear within the baling chamber 24. Movement of the plunger 46 between its fully retracted position, shown in FIG. 1, and its fully extended position (toward the formed bale 48) along an axis A, is guided by the plunger guide system 100.

The baler 10 may also include one or more controllers, such as electronic controller unit (ECU). The controllers may be configured as computing devices with associated processor devices and memory architectures, as hydraulic, electrical or electro-hydraulic controllers, or otherwise. As such, the controllers may be configured to execute various computational and control functionality with respect to the baler 10 (and other machinery). The controllers may be in electronic, hydraulic, or other communication with various other systems or devices of the baler 10 (or machinery). For example, the controllers may be in electronic or hydraulic communication with various actuators, sensors, and other devices within (or outside of) the baler 10, including various devices associated with the bale forming chamber and related mechanisms. Additionally, one or more electro-hydraulic control valves (not shown) may be a part of a baler hydraulic system and interposed in hydraulic lines connecting the hydraulic drive cylinder 54 and the actuators of the stuffing fork 38 and the crop blocking fork 40 with a hydraulic supply associated with the tractor 12. The electro-hydraulic control valve may be electrically activated according to signals from the ECU and may be configured to control the flow of hydraulic fluid between the hydraulic supply associated with the tractor 12, the actuators of the stuffing fork 38 and the crop blocking fork 40 and the hydraulic drive cylinder 54.

Figure 3:
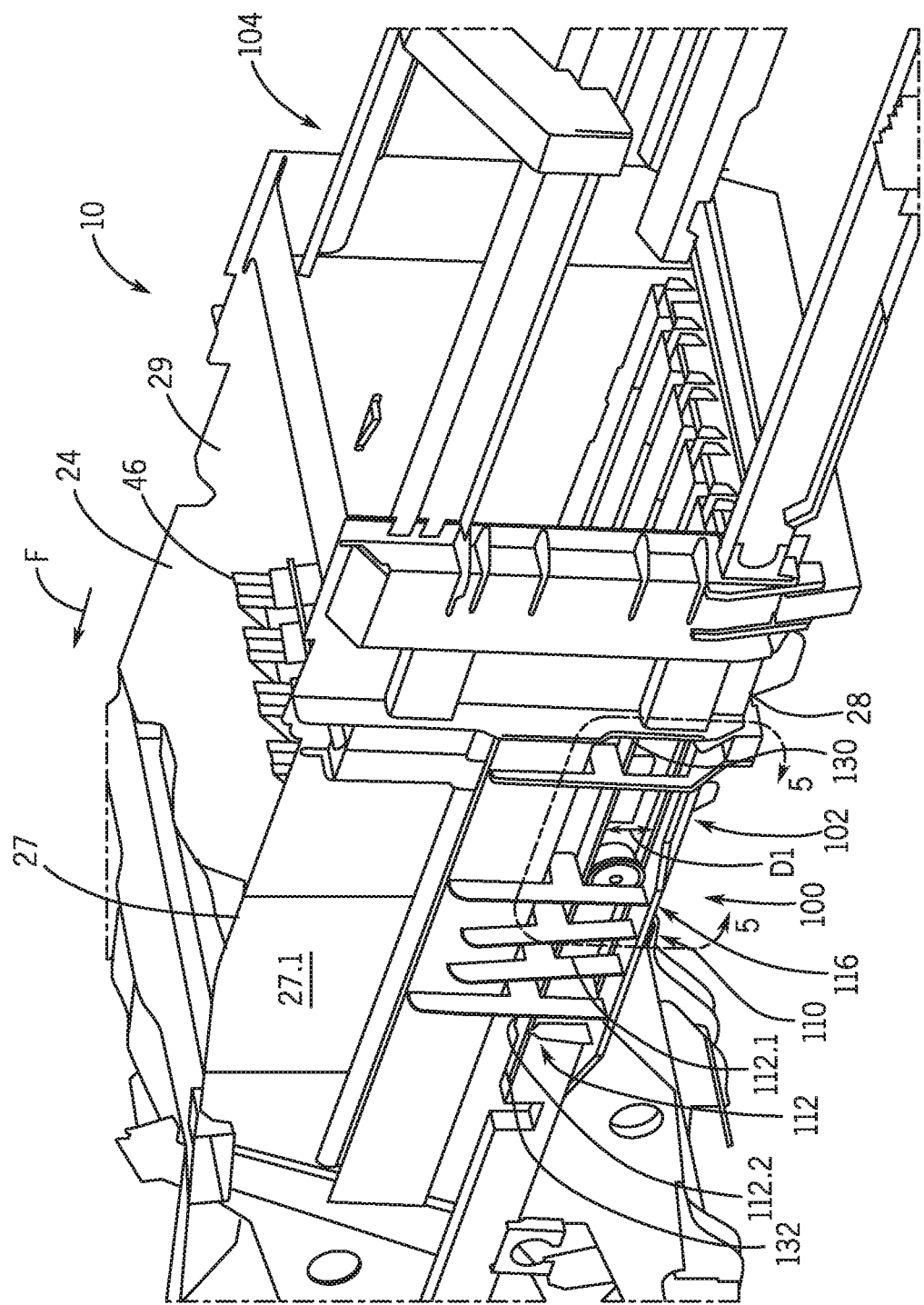
FIG. 3 is a perspective view of the baler of FIG. 1, which illustrates the plunger of disposed within the baling chamber and the plunger guide system coupled external to the baling chamber.
Figure 4:
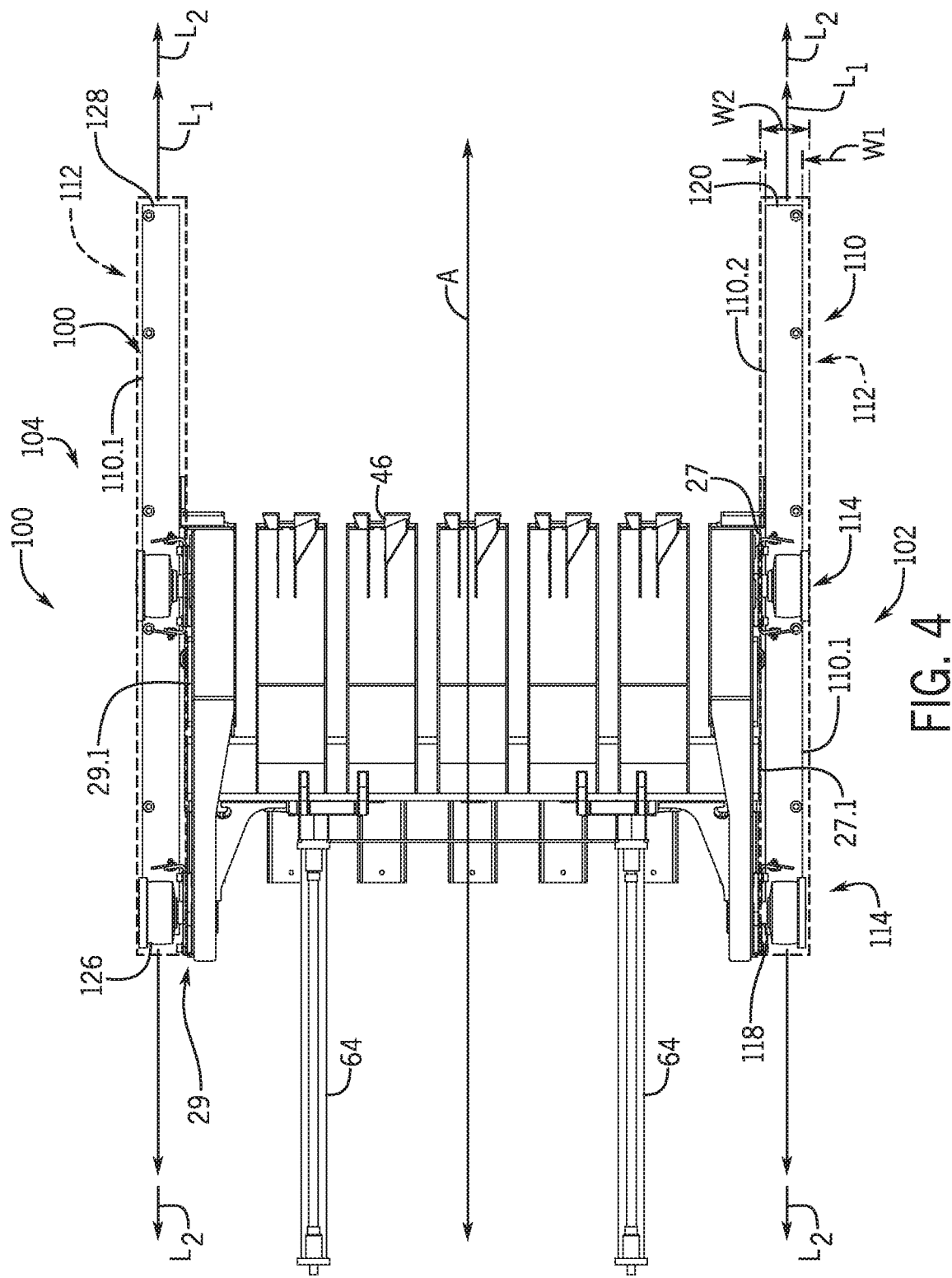
FIG. 4 is a top view of the plunger and the plunger guide system of FIG. 1, with a portion of the plunger guide system in phantom for ease of understanding.

With reference to FIG. 3, the plunger guide system 100 is shown in greater detail. In FIG. 3, the top wall 26 of the baling chamber 24 is removed for clarity. In one example, the plunger guide system 100 is coupled externally to the baling chamber 24 to enable an operator to easily adjust the lateral position of the plunger 46. In various embodiments, the plunger guide system 100 includes a left, first side plunger guide system 102 and a right, second side plunger guide system 104 (FIG. 4). As the first side plunger guide system 102 is the same as the second side plunger guide system 104 (FIG. 4), the first side plunger guide system 102 will be discussed in detail herein and the same reference numerals will be used to denote the same features on the second side plunger guide system 104. The first side plunger guide system 102 and the second side plunger guide system 104 cooperate to guide the plunger 46 within the baling chamber 24, while maintaining a position of the plunger 46 within the baling chamber 24 and enabling lateral adjustment of the plunger 46 within the baling chamber 24.

The first side plunger guide system 102 includes a first guide rail 110, a second guide rail 112 and at least one bearing 114 (FIG. 4). In one example, the first side plunger guide system 102 includes two bearings 114 (FIG. 4). The first guide rail 110 is coupled to an exterior surface 27.1 of the side wall 27 of the baling chamber 24 (it should be understood that the first guide rail 110 of the second side plunger guide system 104 is coupled to an exterior surface of the side wall 29). Generally, with reference to FIG. 4, the first guide rail 110 extends for a length of travel of the plunger 46, and has a first end 118 opposite a second end 120. The first guide rail 110 has a longitudinal axis L1, which is substantially parallel to the axis A of movement of the plunger 46. The first guide rail 110 has a first width W1, which is different, and in one example, less than a second width W2 of the second guide rail 112. The first guide rail 110 may be composed of a suitable metal, metal alloy or polymer, and may be cast, stamped, forged etc. The first guide rail 110 is coupled to the exterior surface 27.1 via any technique, such as welding, riveting, mechanical fasteners, one or more support brackets, etc. The first guide rail 110 has a first edge 110.1 opposite a second edge 110.2. In one example, with reference to FIG. 5, the first edge 110.1 is curved, rounded or has a radius, while the second edge 110.2 is flat. The radius of the first edge 110.1 enables the bearings 114 to roll along the first end 110.1 of the first guide rail 110. It should be noted that, if desired, the second end 110.2 may also be curved, rounded or include a radius. The first guide rail 110 also has a first surface 122 opposite a second surface 124. As will be discussed, the first surface 122 cooperates with the bearings 114.

With reference to FIG. 3, the first guide rail 110 is coupled to the exterior surface 27.1 of the baling chamber 24 so as to be spaced apart from the second guide rail 112 by a distance D1. The second guide rail 112 is coupled to the exterior surface 27.1 of the side wall 27 of the baling chamber 24 (it should be understood that the second guide rail 112 of the second side plunger guide system 104 is coupled to an exterior surface of the side wall 29). With reference to FIG. 4, the second guide rail 112 generally extends for a length of travel of the plunger 46, and has a first end 126 opposite a second end 128. The second guide rail 112 has a longitudinal axis L2, which is substantially parallel to the axis A of movement of the plunger 46, and substantially parallel to the longitudinal axis L1 of the first guide rail 110. The second guide rail 112 may be composed of a suitable metal, metal alloy or polymer, and may be cast, stamped, forged etc. With reference to FIG. 3, the second guide rail 112 is coupled to the exterior surface 27.1 via any technique, such as welding, riveting, mechanical fasteners, one or more support brackets, etc. The second guide rail 112 has a first edge 112.1 opposite a second edge 112.2. In this example, the first edge 112.1 and the second edge 112.2 are each flat. The second guide rail 112 also has a first surface 130 opposite a second surface 132. As will be discussed, the first surface 130 cooperates with the bearings 114.

It should be noted that one or both of the first guide rail 110 and the second guide rail 112 may be coupled to the respective exterior surfaces 27.1, 29.1, via mounting flanges, shims and mechanical fasteners, for example, such that the position of the first guide rail 110 and the second guide rail 112 on the exterior surface 27.1, 29.1 is adjustable laterally (in and out) and vertically (up and down) along the respective side wall 27, 29. Thus, the side walls 27, 29 may include a plurality of bores that receive the mechanical fasteners to enable the lateral and vertical adjustment of the first guide rail 110 and the second guide rail 112 on the exterior surface 27.1, 29.1. Alternatively, the exterior surfaces 27.1, 29.1 may include a plurality of flanges spaced apart along the side walls 27, 29 that receive and support the first guide rail 110 and the second guide rail 112 on the exterior surface 27.1, 29.1 while enabling vertical and lateral adjustment of the first guide rail 110 and the second guide rail 112. In one example, the lateral position of the first guide rail 110 and the second guide rail 112 may be adjusted via one or more mechanical fasteners, such as bolts, and shims, with the shims coupled to the bolts and the bolts coupled to one or more bores defined in the exterior surface 27.1, 29.1 to vertically offset the position of the first guide rail 110 and/or second guide rail 112 relative to the exterior surface 27.1, 29.1. In this example, the one or more mechanical fasteners, such as bolts, may be used to adjust the lateral position of the first guide rail 110 and the second guide rail 112 by varying a clamp force on the bolts.

The at least one bearing 114 is coupled to the plunger 46. In this example, the first side plunger guide system 102 includes two bearings 114, however, it will be understood that the first side plunger guide system 102 may include any number of bearings 114. Each of the bearings 114 guides the movement of the plunger 46 within the baling chamber 24, but is positioned external to the baling chamber 24, which enables for an easy adjustment of the position of the plunger 46. In this example, with reference to FIG. 5, each of the bearings 114 includes a body 140 and a disk 142. The body 140 is annular, and is composed of a metal, metal alloy or polymer, which is cast, forged, stamped, etc. The body 140 defines a first body end 144 opposite a second body end 146, and a sidewall 148 that extends about a perimeter of the body 140 and interconnects the first body end 144 and the second body end 146. A central bore 150 is defined through the body 140 from the first body end 144 to the second body end 146. The central bore 150 receives a portion of a shaft 152 to couple the body 140 to the plunger 46. The first body end 144 is coupled to the disk 142, and the second body end 146 is adjacent to the side 27.1 of the side wall 27. The sidewall 148 defines a first bearing surface S1 for the respective bearing 114. Thus, the first bearing surface S1 is defined about the perimeter of the body 140. Generally, the sidewall 148 contacts and rolls along the first surface 122 of the first guide rail 110 to direct the motion of the plunger 46 within the baling chamber 24. The body 140 may include a roller bearing or other bearing disposed within the sidewall 148 and coupled to the shaft 152 to assist in the rotation of the respective bearing 114, if desired.

Figure 5:
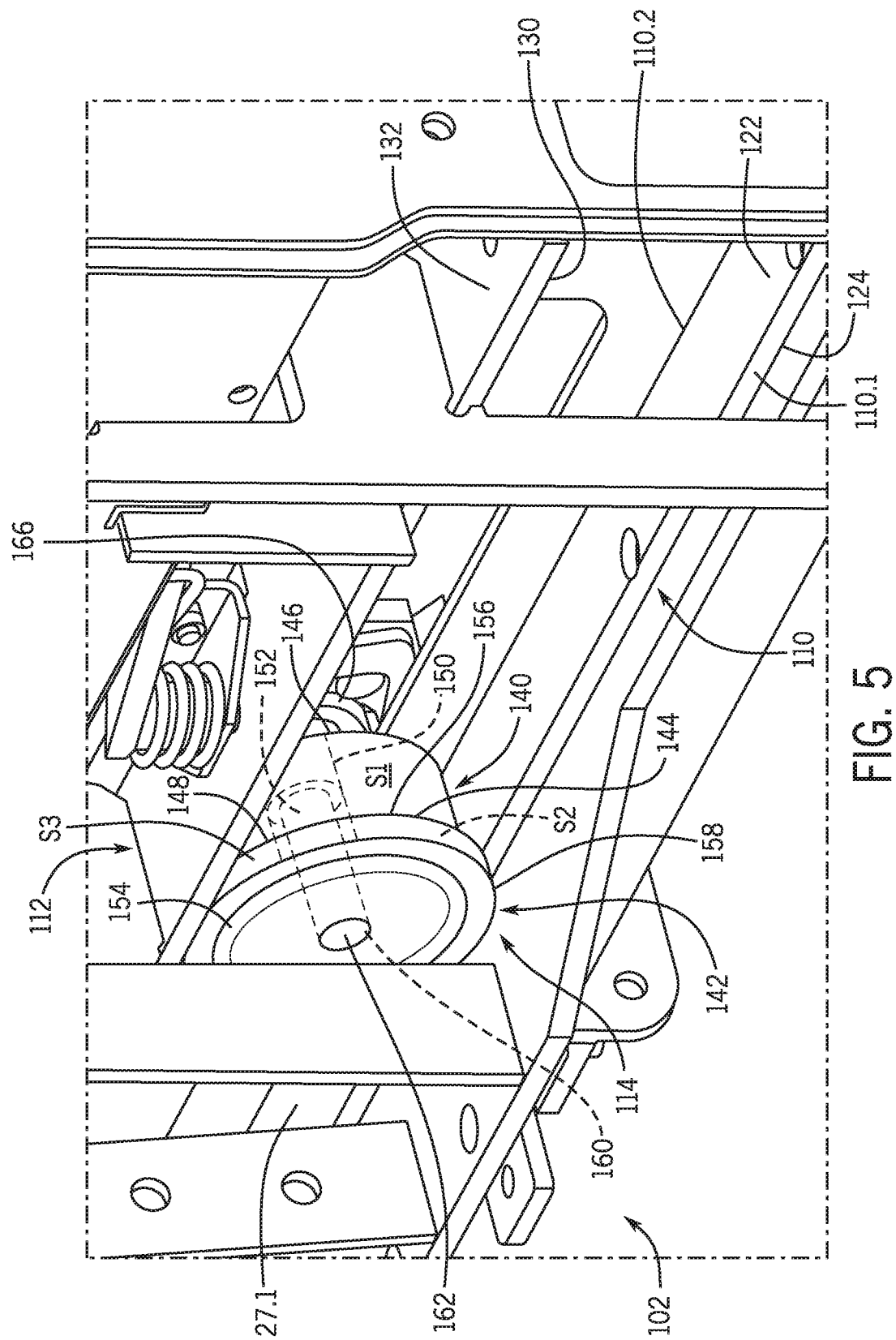
FIG. 5 is a detail view of a bearing of the plunger guide system of FIG. 1, taken from 5 on FIG. 3.
Figure 6:
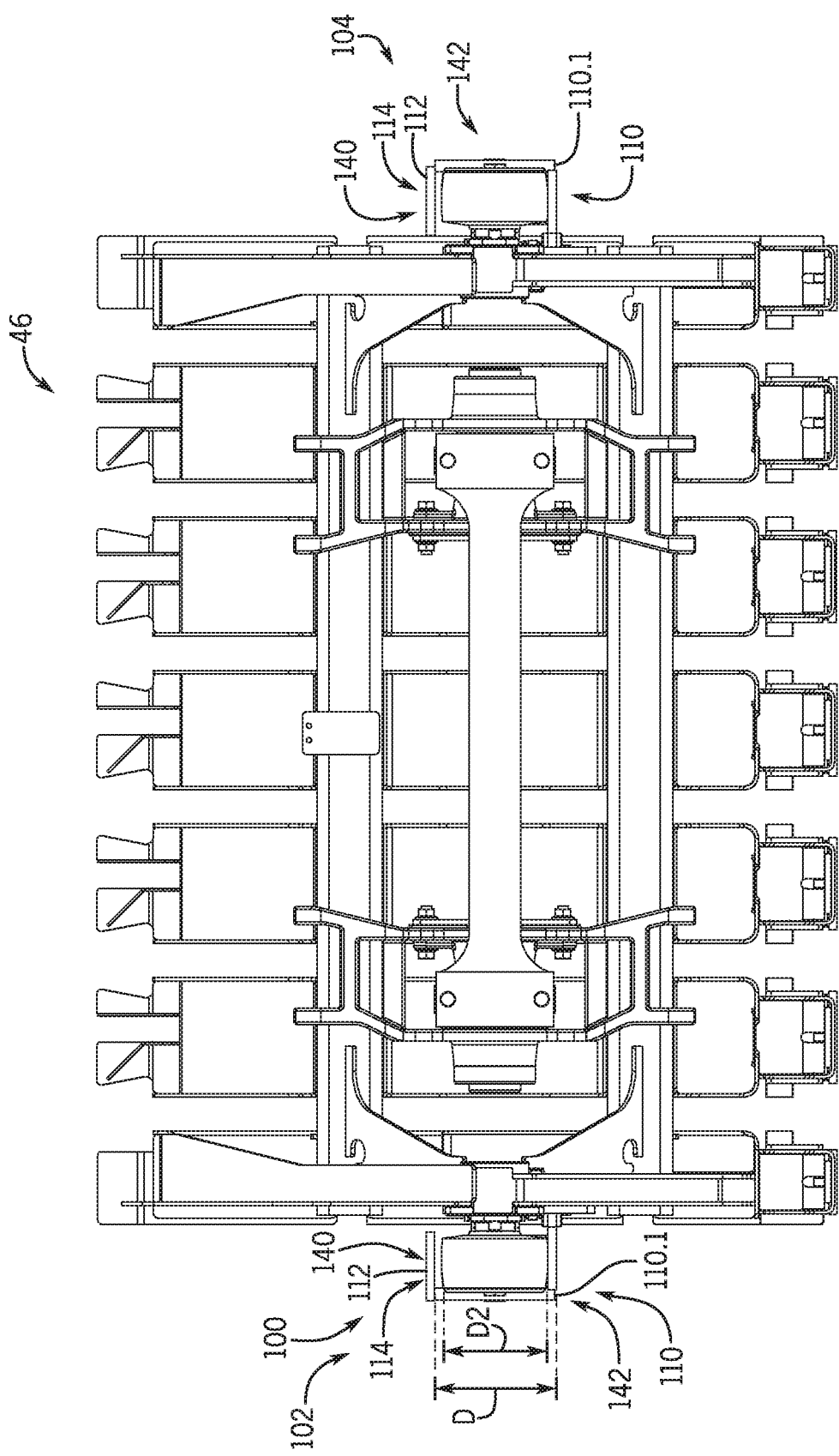
FIG. 6 is an end view of the plunger and the plunger guide system of FIG. 1, with a portion of the plunger guide system in phantom for ease of understanding.
Figure 7:
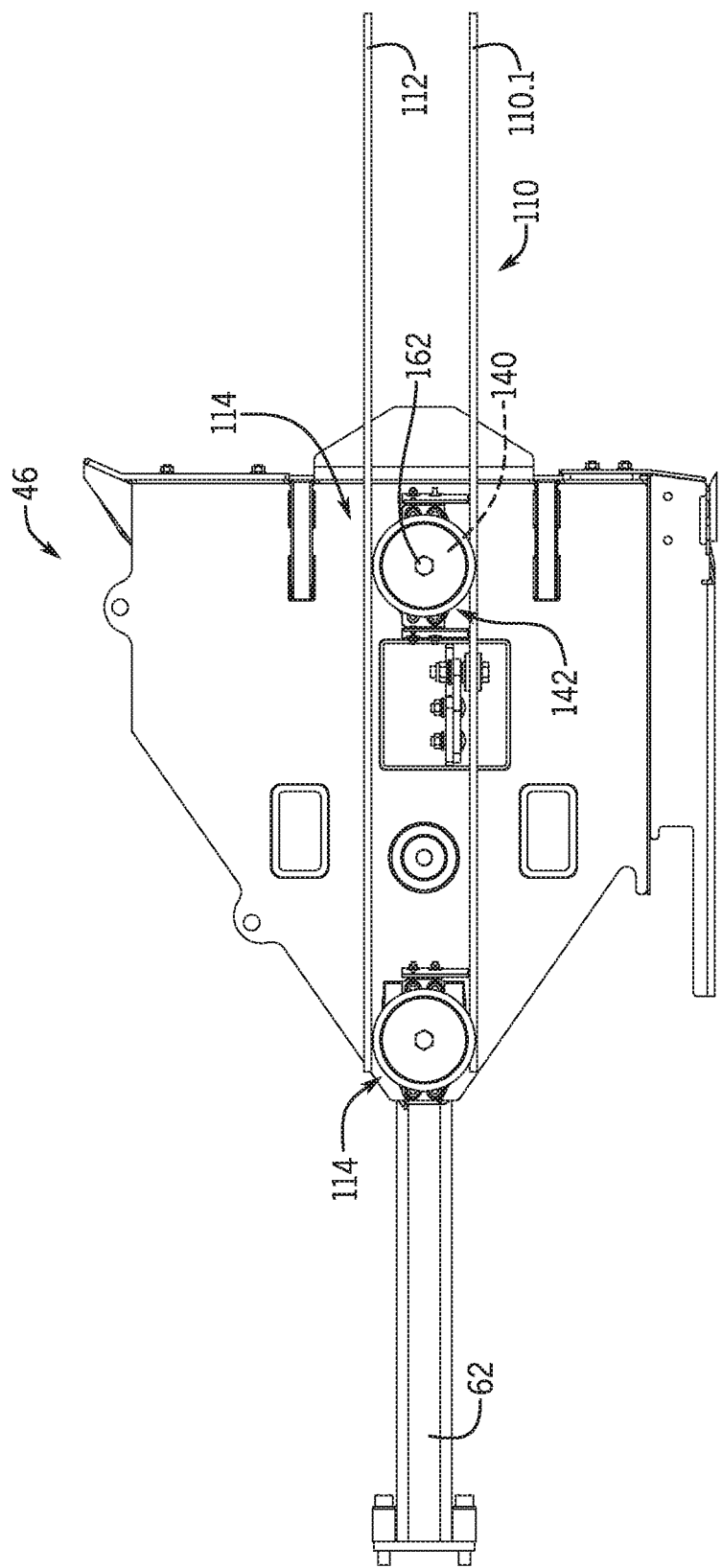
FIG. 7 is a side view of the plunger and the plunger guide system of FIG. 1, with a portion of the plunger guide system in phantom for ease of understanding.
Figure 8:
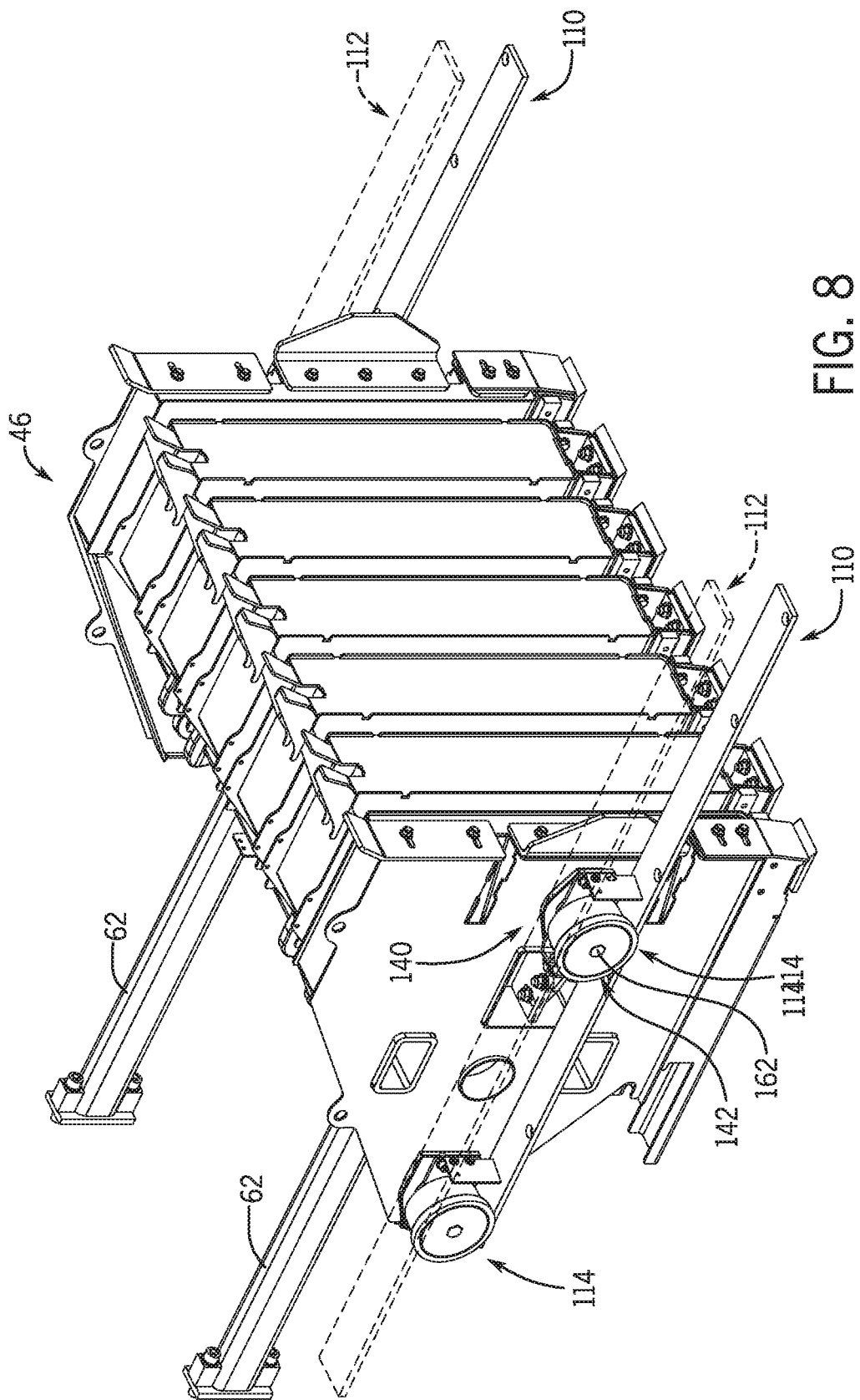
FIG. 8 is a side perspective view of the plunger and the plunger guide system of FIG. 1.

The disk 142 is coupled to the body 140. It should be noted that the disk 142 may be integrally formed with the body 140, if desired. The disk 142 is composed of a metal, metal alloy or polymer, and may be cast, forged, stamped, etc. With brief reference to FIG. 6, the disk 142 has a second diameter D2, which is different than, and in one example, is greater than, a first diameter D of the body 140. Thus, as shown in FIGS. 6 and 7, the disk 142 overhangs the first edge 110.1 of the first guide rail 110, which enables the disk 142 to constrain the lateral movement of the plunger 46. With reference back to FIG. 5, the disk 142 includes a first disk end 154 opposite a second disk end 156, and a disk sidewall 158 interconnects the first disk end 154 with the second disk end 156. The disk 142 is substantially annular, and also defines a disk central bore 160 that extends through the disk 142 from the first disk end 154 to the second disk end 156. The disk central bore 160 couples the disk 142 to the body 140, and thus, the plunger 46. The first disk end 154 faces opposite the body 140 and is an outer surface of the disk 142. The second disk end 156 is coupled to the body 140 and is an inner surface of the disk 142. The second disk end 156 defines a second bearing surface S2 for the respective bearing 114. In one example, the second bearing surface S2 is defined on the second disk end 156 so as to be a portion of a surface of the second disk end 156 between the body 140 and the disk sidewall 158. Stated another way, the second bearing surface S2 is the portion of the inner surface of the disk 142 that is between the body 140 and the disk sidewall 158 or perimeter of the disk 142. The second bearing surface S2 contacts and rolls against the first edge 110.1 of the first guide rail 110 to constrain a lateral movement of the plunger 46 relative to the baling chamber 24 (FIG. 3). It should be noted that in certain configurations, the arrangement of the disk 142 and the body 140 may be reversed such that the disk 142 overhangs the second edge 110.2 of the first guide rail 110 and a bearing surface defined by the first disk end 154 may roll against the second edge 110.2 to constrain the lateral position.

The disk sidewall 158 also defines a third bearing surface S3 for the respective bearing 114. Stated another way, the third bearing surface S3 is defined on a perimeter of the disk 142 or the disk sidewall 158. The disk sidewall 158 contacts and rolls along the first surface 130 of the second guide rail 112 to constrain a vertical movement of the plunger 46 relative to the baling chamber 24. Thus, the first bearing surface S1 and the third bearing surface S3 of the respective bearing 114 cooperates with the first surface 122 of the first guide rail 110 and the first surface 130 of the second guide rail 112 to constrain the vertical movement of the plunger 46 relative to the baling chamber 24 (FIG. 3), and the second bearing surface S2 cooperates with the first edge 110.1 of the first guide rail 110 to constrain the lateral movement of the plunger 46 relative to the baling chamber 24 (FIG. 3). Each of the first bearing surface S1, the second bearing surface S2 and the third bearing surface S3 are discrete, with the second bearing surface S2 and the third bearing surface S3 defined on the disk 142.

Figure 5A:
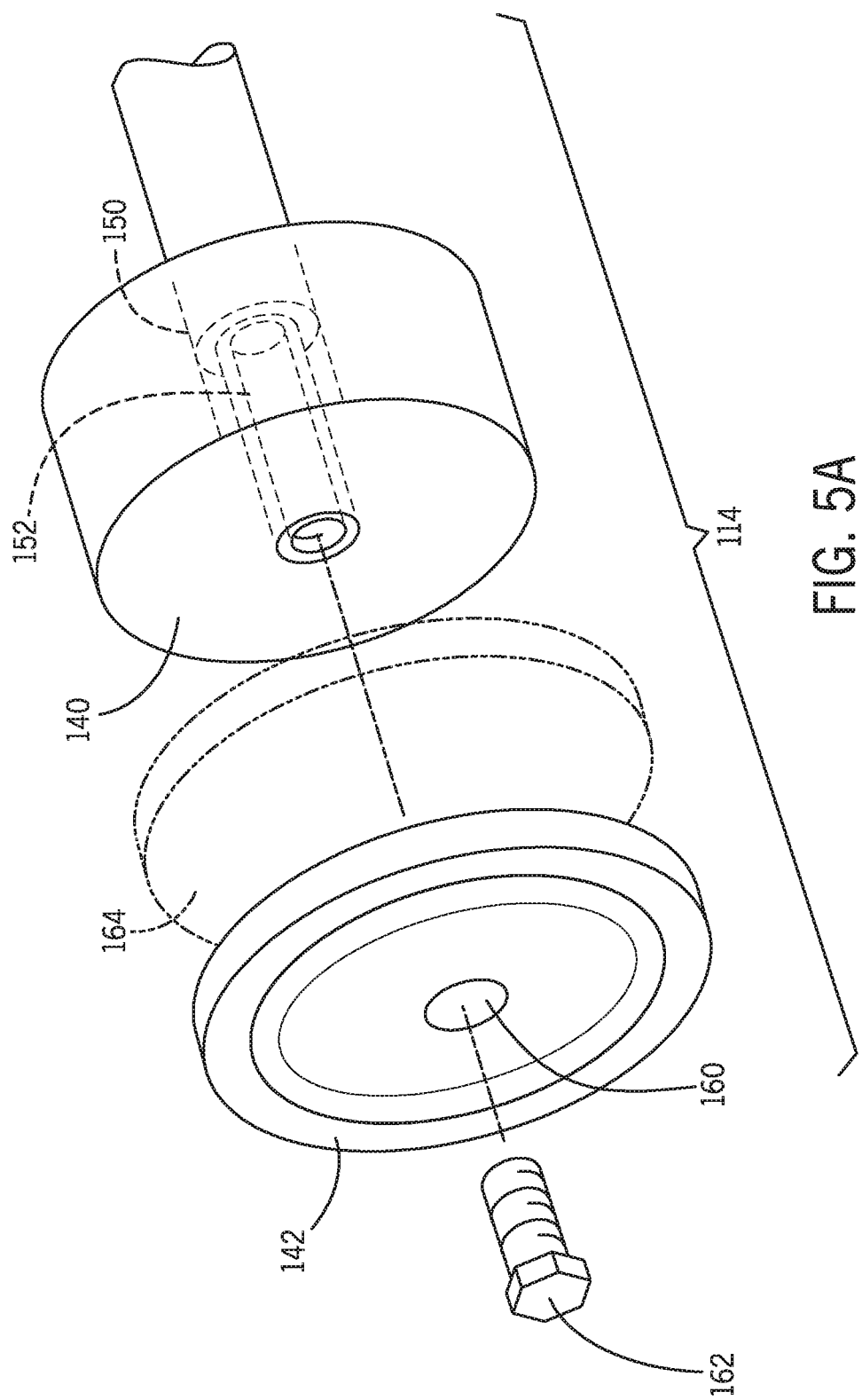
FIG. 5A is an exploded view of the bearing of FIG. 5.

As discussed, the body 140 is coupled to the disk 142 via the shaft 152. The shaft 152 is coupled to the plunger 46 via a mounting bracket, mechanical fasteners, or other technique. In one example, the shaft 152 is press-fit into a bore defined in the plunger 46 and held in place by a keeper bracket 166 (FIG. 5). The keeper bracket 166 may be received in a notch 152' defined in the shaft 152 to couple the shaft 152 to the plunger 46 via a plurality of mechanical fasteners (FIG. 5B). Alternatively, the shaft 152 may include a plurality of external threads, which threadably engage with a threaded bore defined in the plunger 46. As a further alternative, the shaft 152 may be bolted directly to the plunger 46, via a mounting bracket and one or more mechanical fasteners. Thus, generally the shaft 152 is fixedly coupled to the plunger 46, and the bearing 114 is movable or rotatable relative to the shaft 152. In various embodiments, the shaft 152 is tubular and includes a plurality of internal threads. A bolt 162, having a head and a plurality of threads defined along a shank, is received through the disk central bore 160 and the plurality of threads of the bolt 162 threadably engages the plurality of internal threads of the shaft 152 to couple the disk 142 to the body 140. Generally, the disk 142 is coupled to the body 140 such that the disk 142 and the body 140 rotate in unison relative to the shaft 152. In one example, the bolt 162 is a jack bolt. The head of the bolt 162 bears against the first disk end 154 to retain the disk 142 on the shaft 152. By coupling the disk 142 to the body 140 with the bolt 162, one or more shims 164 may be inserted between the disk 142 and the body 140. With reference to FIG. 5A, the shims 164 generally comprise annular disks. The shims 164 have varying thicknesses, and may be sized to overhang the first guide rail 110 to further adjust a lateral position of the plunger 46. The shims 164 may be composed of a metal, metal alloy or polymer, which is cast, machined, stamped, forged, etc. It should be noted that the use of the bolt 162 and the shaft 152 is merely exemplary, as any technique may be employed to couple the disk 142 to the body 140. For example, the disk 142 may be welded to the body 140. Further, while the disk 142 is illustrated and described herein as being coupled to the body 140 via the bolt 162 received through the disk central bore 160, the disk 142 may be coupled to the body 140 by one or more mechanical fasteners that are received through one or more bores defined through the disk 142 near or at a perimeter of the disk 142 that engage one or more bores defined near or at the perimeter of the body 140.

With reference to FIG. 5B, a position of the bearing 114 may also be adjusted via one or more shims 164' coupled to the shaft 152. In this example, the notch 152' of the shaft 152 is sized to receive the keeper bracket 166 and one or more of the shims 164'. The shims 164' may be composed of a metal, metal alloy or polymer, which is cast, machined, stamped, forged, etc. In this example, the shims 164' are curved or arcuate in shape, however, the shims 164' may have any desired shape. The keeper bracket 166 and the one or more shims 164' are coupled to the plunger 46 via one or more mechanical fasteners 167. In this example, the one or more mechanical fasteners 167 are bolts that include a plurality of threads, which threadably engage one or more threaded bores 169 defined within the plunger 46. Thus, the one or more shims 164' cooperate with the shaft 152 to adjust the position of the bearing 114, and thus, the position of the plunger 46 relative to the baling chamber 24.

It should be noted that in certain embodiments, one of the bearings 114 of the first side plunger guide system 102 or the second side plunger guide system 104 may be replaced with a single roller bearing that is sized to cooperate with the first surface 122 of the first guide rail 110 and the first surface 130 of the second guide rail 112 to constrain the vertical movement of the plunger 46 relative to the baling chamber 24.

In one example, with reference to FIG. 5, in order to assemble the first side plunger guide system 102, with the plunger 46 assembled and positioned within the baling chamber 24, the first guide rail 110 and the second guide rail 112 are coupled to the external surface 27.1 of the side wall 27. The shaft 152 of each of the bearings 114 is coupled to the plunger 46. The body 140 of each of the bearings 114 is coupled to the respective shaft 152 such that the first bearing surface S1 contacts the first surface 122 of the first guide rail 110. The disk 142 of each of the bearings 114 is coupled to the respective shaft 152, via the bolt 162 for example. The disk 142 is coupled to the respective body 140 by the bolt 162 such that the disk 142 overhangs the first guide rail 110, the first edge 110.1 contacts the second bearing surface S2 and the third bearing surface S3 contacts the first surface 130 of the second guide rail 112. With the first side plunger guide system 102 coupled to the plunger 46, and disposed external to the baling chamber 24, the second side plunger guide system 104 is coupled to the plunger 46 in the same manner.

With the plunger guide system 100 assembled and coupled to the plunger 46, the plunger guide system 100 enables the adjustment of the lateral and vertical position of the plunger 46 relative to the baling chamber 24 external to the baling chamber 24. In this regard, the one or more shims 164 (FIG. 5A) may be positioned between the disk 142 and the body 140 of one of the first side plunger guide system 102 and the second side plunger guide system 104 to shift a lateral position (left or right) of the plunger 46. Moreover, one or both of the first guide rail 110 and the second guide rail 112 may be adjustable relative to the side walls 27, 29 such that a vertical position and/or a lateral position of the plunger 46 may be adjusted relative to the baling chamber 24.

With reference to FIG. 2, as the baler 10 moves across a field (e.g., as towed by the tractor 12 via the draft tongue 18) and encounters a windrow or other arrangement of material (not shown), the crop pickup 34 may gather the crop material 37 and move it from the crop inlet 30 into the pre-compression chamber 32 for processing into the bale 48. The hydraulic drive cylinder 54 is actuated, based on hydraulic fluid received from the tractor 12 through various control valves and conduits associated with the baler 10, and the hydraulic drive cylinder 54 moves the crank arm 60, thereby translating the plunger 46 within the baling chamber 24 along the axis A to successively compress flakes of crop material 37 within the baling chamber 24 until the bale 48 has been fully formed. Before the formed bale 48 is ejected from the rear of the housing 22, and while the bale 48 is still inside the baling chamber 24, the bale 48 may be wrapped with twine (or other material) and the twine tied by the knotter.

As the plunger 46 moves within the baling chamber 24, the first bearing surface S1 cooperates with the first surface 122 of the first guide rail 110 to constrain the vertical position and/or lateral position of the plunger 46. The second bearing surface S2 cooperates with the first edge 110.1 of the first guide rail 110 to constrain the lateral position of the plunger 46. The third bearing surface S3 cooperates with the first surface 130 of the second guide rail 112 to constrain also constrain the vertical position of the plunger 46.

Over time, due to the crop material 37 or use, the plunger 46 may not be aligned along the axis A within the baling chamber 24. In these instances, the one or more shims 164 may be coupled to the shaft 152 between the disk 142 and the body 140 to adjust the lateral position of the plunger 46. A position of the first guide rail 110 and/or the second guide rail 112 may also be adjusted along the side walls 27, 29 to adjust the vertical position of the plunger 46. It should be noted that while the bearings 114 are described herein as being coupled to the plunger 46 external to the baling chamber 24 via shafts 152 that extend outwardly from the plunger 46, the bearings 114 may also be coupled inside of the plunger 46.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A baler, comprising:
   a housing that defines a baling chamber to receive crop material;
   a plunger movable along an axis within the baling chamber to compress the crop material;
   a first guide rail coupled to an exterior surface of the baling chamber that extends parallel to the axis;
   a second guide rail coupled to the exterior surface of the baling chamber and spaced apart from the first guide rail; and
   at least one bearing coupled to the plunger to guide a movement of the plunger within the baling chamber, the at least one bearing having a first bearing surface, a second bearing surface and a third bearing surface, the first bearing surface engages the first guide rail, the second bearing surface engages the first guide rail and the third bearing surface engages the second guide rail to constrain a vertical movement and a lateral movement of the plunger relative to the baling chamber,
   wherein the first guide rail has a first width and the second guide rail has a second width, and the first width is smaller than the second width.

2. The baler of claim 1, wherein the at least one bearing further comprises an annular bearing body that defines the first bearing surface about a perimeter of the bearing body.

3. The baler of claim 2, wherein the at least one bearing further comprises a disk coupled to the bearing body that defines the second bearing surface and the third bearing surface.

4. The baler of claim 3, wherein the disk overhangs the first guide rail.

5. The baler of claim 3, wherein the second bearing surface is defined on an inner surface of the disk near a perimeter of the disk and the third bearing surface is defined on the perimeter of the disk.

6. The baler of claim 3, wherein the disk is adjustably coupled to the bearing body by a threaded shaft.

7. The baler of claim 3, wherein one or more shims are positionable between the disk and the bearing body to adjust a position of the second contact surface.

8. The baler of claim 3, wherein the bearing body has a first diameter and the disk has a second diameter, and the second diameter is greater than the first diameter.

9. The baler of claim 1, wherein one or more shims are positionable between the bearing body and the plunger to adjust a position of the bearing.

10. A baler, comprising:
    a housing that defines a baling chamber to receive crop material;
    a plunger movable along an axis within the baling chamber to compress the crop material;
    a first guide rail coupled to an exterior surface of the baling chamber that extends parallel to the axis;
    a second guide rail coupled to the exterior surface of the baling chamber and spaced apart from the first guide rail; and
    at least one bearing coupled to the plunger to guide a movement of the plunger within the baling chamber, the at least one bearing including a bearing body having a first bearing surface and a disk having second bearing surface and a third bearing surface, the first bearing surface engages the first guide rail, the second bearing surface engages the first guide rail and the third bearing surface engages the second guide rail to constrain a vertical movement and a lateral movement of the plunger relative to the baling chamber,
    wherein the first guide rail has a first width and the second guide rail has a second width, and the first width is smaller than the second width.

11. The baler of claim 10, wherein the disk overhangs the first guide rail.

12. The baler of claim 10, wherein the first bearing surface is defined about a perimeter of the bearing body, the second bearing surface is defined on an inner surface of the disk near a perimeter of the disk and the third bearing surface is defined on the perimeter of the disk.

13. The baler of claim 10, wherein the disk is adjustably coupled to the bearing body by a threaded shaft.

14. The baler of claim 10, wherein one or more shims are positionable between the disk and the bearing body to adjust a position of the second contact surface.

15. The baler of claim 10, wherein the bearing body has a first diameter and the disk has a second diameter, and the second diameter is greater than the first diameter.

16. A baler, comprising:
    a housing that defines a baling chamber to receive crop material;
    a plunger movable along an axis within the baling chamber to compress the crop material;
    a first guide rail coupled to an exterior surface of the baling chamber that extends parallel to the axis;
    a second guide rail coupled to the exterior surface of the baling chamber and spaced apart from the first guide rail; and
    at least one bearing coupled to the plunger to guide a movement of the plunger within the baling chamber, the at least one bearing including a bearing body having a first bearing surface defined about a perimeter of the bearing body and a disk having second bearing surface defined on an inner surface of the disk near a perimeter of the disk and a third bearing surface defined on the perimeter of the disk, the disk overhangs the first guide rail, the bearing body adjustably coupled to the disk, the first bearing surface engages the first guide rail, the second bearing surface engages the first guide rail and the third bearing surface engages the second guide rail to constrain a vertical movement and a lateral movement of the plunger relative to the baling chamber,
    wherein the first guide rail has a first width and the second guide rail has a second width, and the first width is smaller than the second width.

* * * * *